Figure 1:
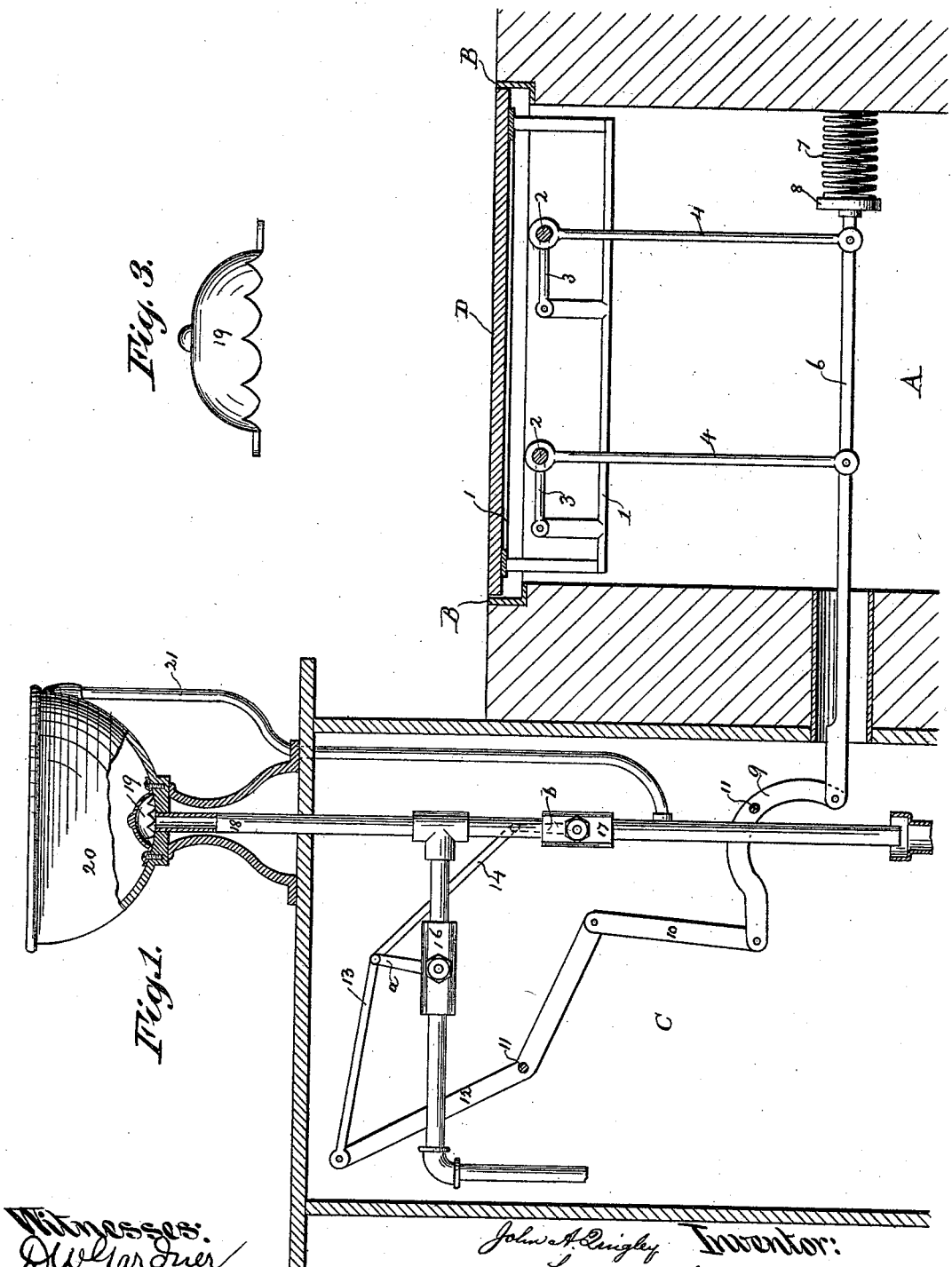

(No Model.) 2 Sheets—Sheet 1.

J. A. QUIGLEY.
SANITARY AND AUTOMATIC DRINKING BASIN FOR ANIMALS.

No. 434,072. Patented Aug. 12, 1890.

(No Model.) 2 Sheets—Sheet 2.

J. A. QUIGLEY.
SANITARY AND AUTOMATIC DRINKING BASIN FOR ANIMALS.

No. 434,072. Patented Aug. 12, 1890.

Witnesses:
D. W. Gardner

John A. Quigley Inventor:
by A. S. Cushman
his attorney

UNITED STATES PATENT OFFICE.

JOHN A. QUIGLEY, OF NEW UTRECHT, NEW YORK.

SANITARY AND AUTOMATIC DRINKING-BASIN FOR ANIMALS.

SPECIFICATION forming part of Letters Patent No. 434,072, dated August 12, 1890.

Application filed February 14, 1890. Serial No. 340,461. (No model.)

*To all whom it may concern:*

Be it known that I, JOHN A. QUIGLEY, a citizen of the United States, residing in the town of New Utrecht, Kings county, in the State of New York, have invented a new and useful Improvement in Hydrant Watering-Basins for Animals, of which the following is a full, clear, exact, and concise description, reference being had to the accompanying drawings, in which similar letters and figures refer to similar parts throughout the several views.

My invention relates to a sanitary drinking-basin whereby animals may be provided, upon pressing upon a pedal, with sufficient water for drinking, and yet will be less liable than in the use of ordinary watering-troughs to contract or communicate disease from drinking out of a trough used by other animals. As such troughs have been heretofore constructed the water is not readily changed after each animal has assuaged its thirst, and generally a fresh supply of water is allowed to flow and mingle with the infectious water remaining in the trough, whereby mucus, saliva, or other secretions or excretions from the mouth and nostrils of the animals which have previously drank in the trough are in a more or less diluted form imbibed, and thus a watering-trough becomes a source of danger to every sound horse when it has been previously used by a diseased animal.

The objects of my invention are to provide such an arrangement of the inflow and outflow conduits, together with an automatic mechanism operating in such manner that the trough or basin shall be successively supplied and emptied as each animal uses it; to provide means for preventing water from standing and congealing in the basin or conduits or becoming stagnant or filthy; to connect the valves of the respective conduits so that upon the opening of one the other shall close, and vice versa, the closing of one shall open the other; also, to provide means so that an animal on attempting to drink shall operate such valves by his stepping upon or from a platform, and thereby actuate the mechanism therefor, and, finally, to disperse the water as it enters the basin, so that it shall not shoot up in a single stream. These objects I accomplish by my invention, which consists in a drinking-basin provided with a single outflow and inflow conduit, having a branch pipe near its connection with an insertion in the bottom of the basin, so that the basin-pipe at such junction shall serve as an outflow and an inflow conduit alternately, each conduit being provided with a valve for the purpose of regulating, determining, or interrupting the flow of water, together with suitable mechanism adapted to reciprocally open one valve and shut the other, or shut the one and open the other, as may be desired; also, in the combination of such basin, conduits, and mechanism with other mechanism, whereby the whole may be operated through a system of connecting-levers actuated by pressure upon a treadle or platform and by the cessation of such pressure.

It also consists in a dispersing device to divide the inflow-current into several lateral jets, all as hereinafter set forth.

Figure 2:
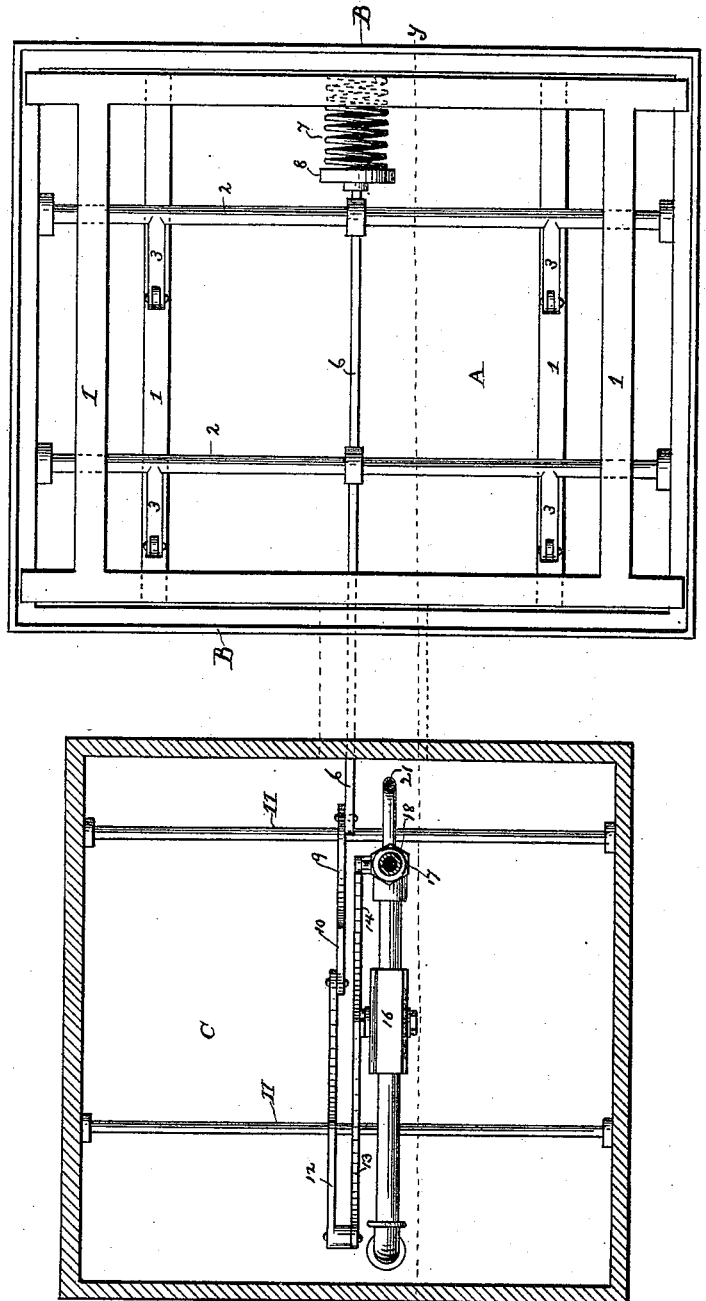

In the accompanying drawings, Figure 1 is a sectional view taken in the plane of the dotted line $x\ y$, shown in Fig. 2, and showing the pits, treadle, and connecting mechanism for opening and closing the valves, together with their connection with the drinking-basin and its overflow-pipe. Fig. 2 is a plan view with the treadle-floor and the basin removed, showing the series of levers and the arrangement of pipes and valves within the pit and as disconnected from the bottom of the drinking-basin. Fig. 3 is an elevation of my disperser.

A represents the pit for treadle; B, stationary frame; C, lever-pit; D, treadle-floor; 1, movable treadle-support; 2, pivot-bars; 3, lateral arms; 4, depending arms; 5, yoke-joints; 6, reciprocating bar; 8, spring-bearing; 7, spring; 9, curved lever; 10, lower link-bar to same; 11, fixed pivots; 12, upper bar; 13, supply-valve bar; 14, outlet-valve bar; 16, supply-valve chamber; 17, outlet-valve chamber; 18, basin-pipe; 19, disperser; 20, fountain-basin; 21, overflow-pipe; *a*, supply-valve arm, and *b* outlet-valve arm.

In any hydrant-supply a pit A is made and walled up sufficient to admit of the location of the horse-treadle arrangement shown in Fig. 1, which consists of a stationary iron frame B, supporting a treadle floor or platform of wood or iron D, Fig. 1, in the opposite ends of which frame are journaled pivot-bars 2, capable of partial revolution and provided with lateral arms 3. These lateral arms support the movable frame of treadle-supports 1, upon which is laid an ordinary treadle floor or step, (shown in Fig. 1 of the drawings,) being such as is ordinarily used at horse-railroad switches, and is intended to receive the weight of the horse when he comes to the basin and to press the treadle-step down until it bears upon stationary frame B.

The treadle-step rests upon treadle-supports 1, which are movably connected with the lateral arms 3 of the pivot-bars 2, whereby upon the descent of the treadle-step they cause the pivot-bar to partially rotate. The pivot-bars are also respectively provided with a depending lever-arm 4, rigidly connected with the pivot-bars 2, but movably connected with a reciprocating bar 6, one end of which 8, within the pit, bears against a spring 7, the action of which spring, by means of the depending arm 4, maintains the treadle-step in an elevated position above the frame B when not in use. The reciprocating bar is prolonged beyond and into a pit C, beneath the basin, and is movably connected at such extremity with an arm of a curved lever 9, fulcrumed at a convenient point upon a bar 11 and connected by link-bar 10 to upper lever-bar 12, so as to actuate to move the supply-valve bar 13 and move the supply-valve arm $a$ the requisite distance to allow the flow of water through the chamber 16. The outlet-valve in the outlet-chamber is also supplied with a similar bar 14 and outlet-valve arm $b$, which is movably connected with the supply-valve bar and so adjusted that when the supply-valve is opened the outlet-valve is closed, and, vice versa, when the supply-valve is shut, the outlet-valve shall open by a single impulse.

The supply-pipe and its valve-chamber may be connected, as shown in Fig. 1, at any convenient point with the basin-pipe 18; but if such connection is not proximate to the basin-pipe the supply-pipe should slope downward sufficiently after leaving the valve-chamber to make sure that no water can stand in such portion of the pipe after the supply is shut off. An overflow-pipe 21 is provided to carry off any surplus of supply while the animal remains upon the treadle-platform, and discharges into the outflow-conduit below the outflow-valve chamber.

The disperser 19 is a hollow metallic cap with projecting points secured to the bottom of the drinking-basin by screws or bolts or in any other manner so as to invert it over the opening in the basin-pipe, so that the jet of supply-water shall be forced in various directions along the bottom and sides of the basin and not directly upward.

The mode of operation of my drinking device is as follows: When the horse places his fore feet upon the treadle step or floor, the depression of the treadle causes the short arm 3 to turn the pivot-bars 2, which make a partial revolution upon their axes, and thus move the depending arms 4, which force back the reciprocating bar 6 against the spring 7, and at the same time actuate the several levers 9 and 12 and connecting-bars 10 and 13, and thus open the supply-valve chamber and close the outlet-chamber. When the horse steps off from the treadle-step, the action of the restoring-spring 7 reciprocates the bar 6 in an opposite direction, and by means of the levers and their connections opens the outlet-chamber and closes the supply-chamber.

I do not wish to limit my claim to two separate valve-chambers, as the outlet and supply pipes may enter into a single chamber and have a valve common to both, so that the turning of one valve may produce the same result by operating a single lever-bar; but I prefer the device I have described and shown, since I think it the more practicable.

What I claim as new, and desire to secure by Letters Patent, is—

The combination of a drinking-basin provided with a single pipe for alternate supply and exhaust, a branch supply-pipe connected with and entering into such main pipe above the outlet-valve, such supply-pipe being provided with a valve for opening and closing the same, a valve in the main pipe below the entrance of the supply-pipe, adapted to open and close the same, and both valves in both pipes adapted to be actuated by levers simultaneously, so that a single movement opens one and closes the other, and, vice versa, closes one and opens the other, both valves being connected to the same bar in common by hinge-joints, and such bar operated by a platform-treadle provided with a spring to counteract pressure thereon, and so adapted that a depression of the treadle shall open the supply-valve and close the outlet-valve, and the elevation of the treadle shall open the outlet-valve and close the supply-valve, substantially as described.

JOHN A. QUIGLEY.

Witnesses:
 MARY VOGT,
 LIZZIE E. CROPSEY.